United States Patent
Heilig

(10) Patent No.: US 7,845,843 B2
(45) Date of Patent: Dec. 7, 2010

(54) COMPENSATION DEVICE FOR COMPENSATING THE ANGULAR DISCREPANCY OF A MIXING DRUM

(75) Inventor: Eduard Heilig, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 582 days.

(21) Appl. No.: 11/910,482

(22) PCT Filed: Jun. 7, 2006

(86) PCT No.: PCT/EP2006/005421

§ 371 (c)(1),
(2), (4) Date: Oct. 2, 2007

(87) PCT Pub. No.: WO2006/131335

PCT Pub. Date: Dec. 14, 2006

(65) Prior Publication Data

US 2008/0273416 A1    Nov. 6, 2008

(30) Foreign Application Priority Data

Jun. 10, 2005 (DE) .................. 10 2005 027 038
Mar. 23, 2006 (DE) .................. 10 2006 013 372

(51) Int. Cl.
    *B28C 5/20*       (2006.01)
    *B01F 9/02*       (2006.01)

(52) U.S. Cl. ......................... 366/62; 366/232

(58) Field of Classification Search ............. 366/62, 366/63, 232

See application file for complete search history.

(56) References Cited

U.S. PATENT DOCUMENTS

| | | | |
|---|---|---|---|
| 186,570 A | 1/1877 | Huffman | |
| 2,265,053 A | 12/1941 | Anderson | |
| 2,511,240 A | 6/1950 | Bohmer et al. | |
| 2,895,722 A | 7/1959 | Hunkins | |
| 3,658,303 A | 4/1972 | Funk | |
| 3,749,372 A * | 7/1973 | Funk | 366/60 |
| 3,756,572 A | 9/1973 | Buelow et al. | |
| 3,785,622 A | 1/1974 | Johnson | |
| 3,825,232 A | 7/1974 | Pecorari | |
| 4,378,163 A | 3/1983 | Jameson et al. | |
| 4,425,813 A | 1/1984 | Wadensten | |
| 4,453,830 A | 6/1984 | Jameson et al. | |
| 4,575,254 A | 3/1986 | Johnston | |
| 5,149,126 A | 9/1992 | Brennan | |
| 5,820,258 A | 10/1998 | Braun | |
| 6,569,047 B2 | 5/2003 | Grauby et al. | |
| 6,689,160 B1 | 2/2004 | Okuda et al. | |
| 7,331,701 B2* | 2/2008 | Heilig et al. | 366/63 |
| 2008/0273416 A1* | 11/2008 | Heilig | 366/62 |
| 2008/0291772 A1* | 11/2008 | Mollhagen | 366/63 |
| 2009/0034363 A1* | 2/2009 | Frondorf et al. | 366/232 |

FOREIGN PATENT DOCUMENTS

AT     327 693     2/1976

(Continued)

*Primary Examiner*—Tony G Soohoo
(74) *Attorney, Agent, or Firm*—Davis & Bujold, P.L.L.C.

(57) ABSTRACT

A compensation device has one first component (5) and one second component (12) between which elastic elements (11, 15) are placed by way of which an angular discrepancy between a mixing drum and a bearing bracket is compensated in a truck mixer.

11 Claims, 5 Drawing Sheets

FOREIGN PATENT DOCUMENTS

| | | |
|---|---|---|
| DE | 1 182 126 | 11/1964 |
| DE | 23 41 250 | 2/1975 |
| DE | 31 21 797 A1 | 12/1982 |
| DE | 42 43 447 A1 | 6/1994 |
| DE | 195 37 462 A1 | 4/1997 |
| DE | 196 12 309 A1 | 10/1997 |
| DE | 100 33 661 A1 | 1/2002 |
| DE | 20 2004 020 30 U1 | 6/2005 |
| DE | 20 2004 020 370 U1 | 6/2005 |
| EP | 1 186 390 A2 | 3/2002 |
| EP | 1 186 802 A1 | 3/2002 |
| FR | 2.146.053 | 2/1973 |
| FR | 2.221.029 | 10/1974 |
| GB | 543123 | 2/1942 |
| GB | 668010 | 3/1952 |
| JP | 56-10848 | 2/1981 |
| SU | 1364486 A1 | 1/1988 |
| WO | WO 2006/015832 A1 | 2/2006 |
| WO | WO-2006/015833 A1 | 2/2006 |
| WO | WO-2006/015839 A1 | 2/2006 |
| WO | WO-2006/131335 A2 | 12/2006 |

* cited by examiner

COMPENSATION DEVICE FOR COMPENSATING THE ANGULAR DISCREPANCY OF A MIXING DRUM

This application is a national stage completion of PCT/EP2006/005421 filed Jun. 7, 2006, which claims priority from DE 10 2006 013 372.2 filed Mar. 23, 2006 and German Application Serial No. 10 2005 027 038.7 filed Jun. 10, 2005.

FIELD OF THE INVENTION

The invention relates to a compensation device for compensating an angular discrepancy of a mixing drum.

BACKGROUND OF THE INVENTION

Mixing drums on truck mixers are supported in a drive mechanism, which is secured to a bearing bracket and, likewise, supported via rear drum bearings so that the drum can rotate. The drum has an angle of tilt such that the drive mechanism has to support the drum in vertical and horizontal directions. The bearing bracket, upon which the drive mechanism is fixed, is connected to the vehicle chassis of the truck mixer. During travel on uneven ground, it is possible that the vehicle chassis contorts and a discrepant angle appears between the drum and the bearing bracket, which is connected to the vehicle chassis. The discrepant angle has to be compensated for via a compensation device.

DE 20 2004 020 370 U1 discloses a compensating device to compensate for a discrepant angle of a mixing drum wherein, an elastic element is placed between a first component and a second component, through which the weight of the mixing drum can be supported in the bearing bracket. Even though the compensation device has for the support of the axial forces, an additional stop through which the weight of the drum can be transferred reliably, the torque produced by the drive to rotate the mixing drum is supported by a very small surface.

The problem on which this invention is based is to create a compensation device to compensate for an angular discrepancy of a mixing drum relative to a bearing bracket through which the weight of the drum and the torque of the drive can be reliably supported.

SUMMARY OF THE INVENTION

The inventive compensation device comprises one first component which has one mandrel at the ends of which attach surfaces extending radially relative to the outer surface of the mandrel, whereby the mandrel forms with the surfaces U-shaped cavity. A second component of the compensation device has a hollow body with an inner surface and an outer surface, an elastic element being situated between the inner surface of the hollow body and the mandrel of the first component. The mandrel is preferably designed as a truncated cone and the inner surface of the hollow body is located to with the outer surface of the mandrel. It is thereby possible to keep the elastic element stationary between the hollow body and the mandrel. The hollow body, likewise, has surfaces extending radially to its outer surface and delimiting a base. The base is between the surfaces of the first component thus interrupting the U-shaped element. Between the surfaces of the second component (the base), and the surfaces of the first component (the lateral surfaces) of the U-shaped element, there are elastic elements arranged, the displacement of the surfaces of the first element and of the surfaces of the second element as well as the thickness of the elastic elements, being selected so that the elastic elements are under prestress. The radial outer end of the surfaces of the second element (the outer end of the base) is designed to be connectable or integral with the bearing bracket of the mixing truck, the first element is designed to be connectable or integral with the housing of the drum drive.

It is also possible to connect the second element with the bearing bracket and the first element with the drum drive. The elastic elements, placed between the surfaces of the first element are under prestress and are designed as cuboidal elements disposed so that their longitudinal span corresponds to the longitudinal span of the mixing drum whereby the elements reliably receiving the generating torque for rotating the mixing drum.

In one development, on the upper and lower sides of the elastic elements, preferably at a right angle to the longitudinal direction of the elastic elements, there are projections which inset in recesses of the surfaces of the first element and of the surfaces of the second element such that the elastic elements are kept stationary. The elastic element between the mandrel and the hollow body thus receives the horizontal and axial forces which result from the weight of the mixing drum and the elastic elements between the base and the U-shaped element perceive the supporting function of the torque for driving the mixing drum and also the vertical weight of the drum. With the elastic elements all being under prestressed during the assembly, the elastic elements can be mounted without previous vulcanization or sealing. By virtue of separating the torque support and the support of the axially and horizontally acting forces, it is possible to design the elastic element between the mandrel and the hollow body with small diameter whereby the travel within the element is reduced during rotating motions.

BRIEF DESCRIPTION OF THE DRAWINGS

The invention will now be described, by way of example, with reference to the accompanying drawings in which.

DETAILED DESCRIPTION OF THE INVENTION

Figure 1:
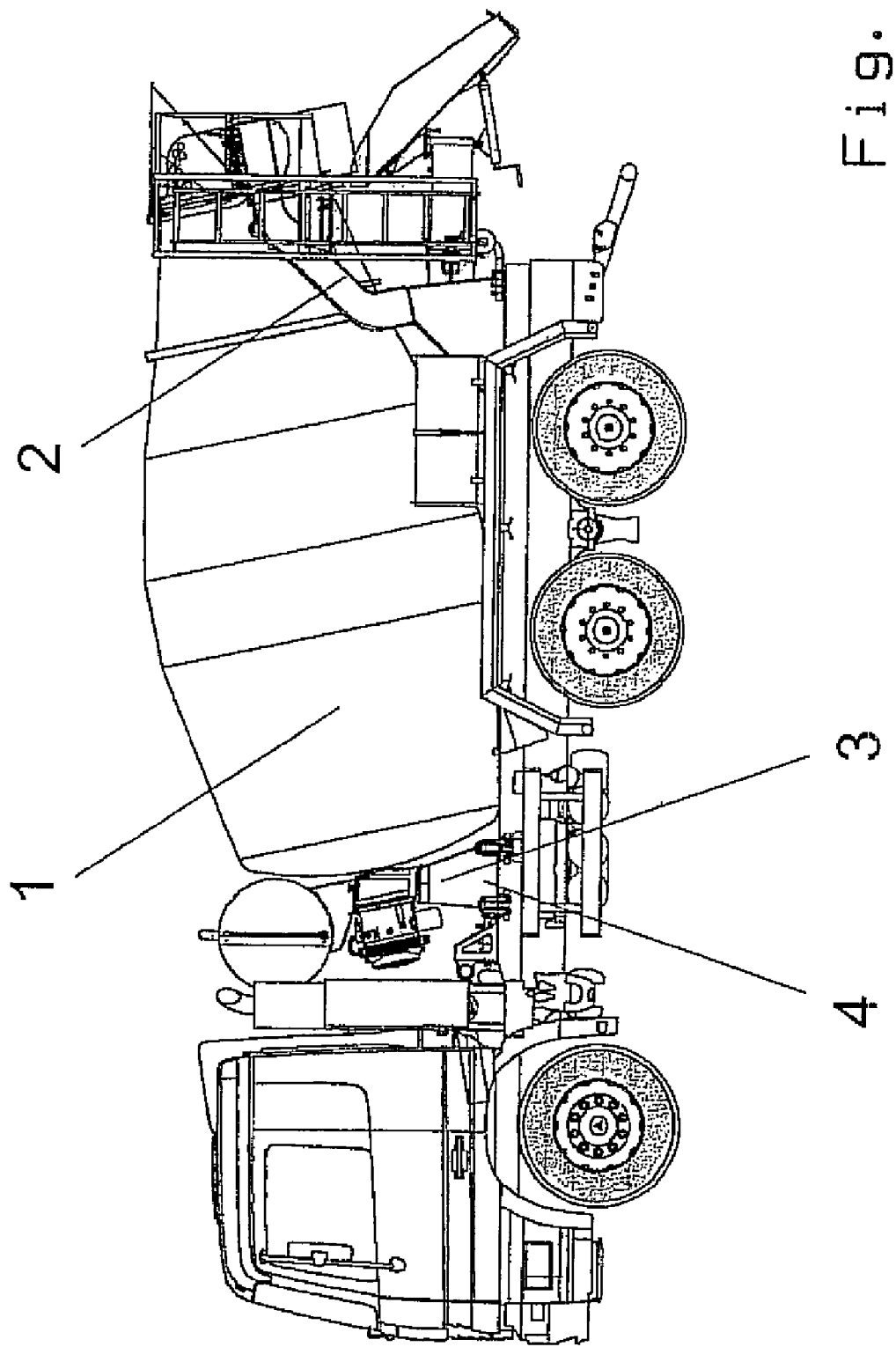
FIG. 1 is a truck mixer.

FIG. 1 shows a truck mixer for transporting concrete has a mixing drum 1, which is rotatably supported by rear mixing drum bearings 2 and one drum drive 3. The drum drive 3 is held stationarily on a bearing bracket 4 and connected with the vehicle chassis of the truck mixer. When traveling over uneven ground the vehicle chassis flexes and the bearing bracket 4 moves relative to the mixing drum 1. A compensation device is placed between the drum drive 3 and the bearing bracket 4 is placed to compensate for the discrepant angle.

Figure 2:
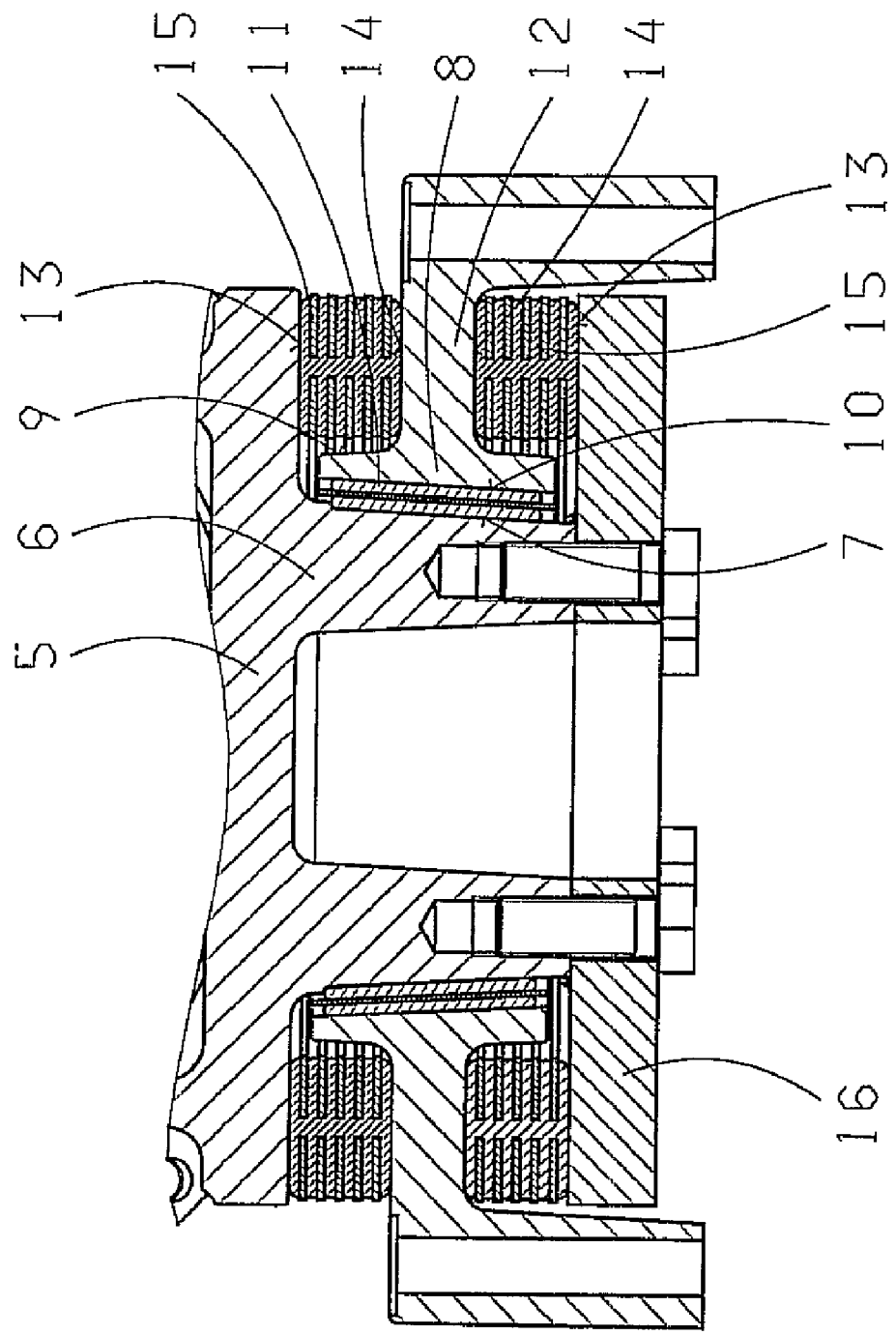
FIG. 2 is sectional view of a compensation device.

FIG. 2 shows a first component 5, which is designed to be integral with or connectable to the drum drive 3 of FIG. 1, has one mandrel 6 with an outer surface 7 that is conically built so that the mandrel 6 has the shape of a truncated cone. A hollow body 8 has an outer surface 9 and an inner surface 10 and an elastic element 11 is arranged between the inner surface 10 and the outer surface 7. The elastic element 11 is produced from an elastomer with a metal insert. At the end of the mandrel 6, surfaces 13 extend radially outward from the outer surface 7 such that the surfaces 13 and the outer surface 7 form a U-shaped element. Radially from the outer surface 9 extend the surfaces 14 which form a base. On the radially outer end of the surfaces 14, a second component 12 is designed so as to be connectable with the bearing bracket 4 of FIG. 1. Elastic elements 15 are situated between the surfaces 14 and the surfaces 13 to support the torque, the upper layered spring sets serving also for receiving the vertically acting weight. The elastic elements 15 are preferably designed as layered springs, with elastomeric parts being spaced by metal parts. It is also possible to substitute other elastic elements for the elastic elements 15, such as plate springs or spiral springs. The spacing of the surfaces 13 to the surfaces 14 is less than the total height of the elastic elements 14 such that the elastic elements 15 are prestressed. The assembly is carried out by screwing a plate 16 on the mandrel 6 after the second component and the elastic elements 11 and 15 have been introduced.

Figure 3:
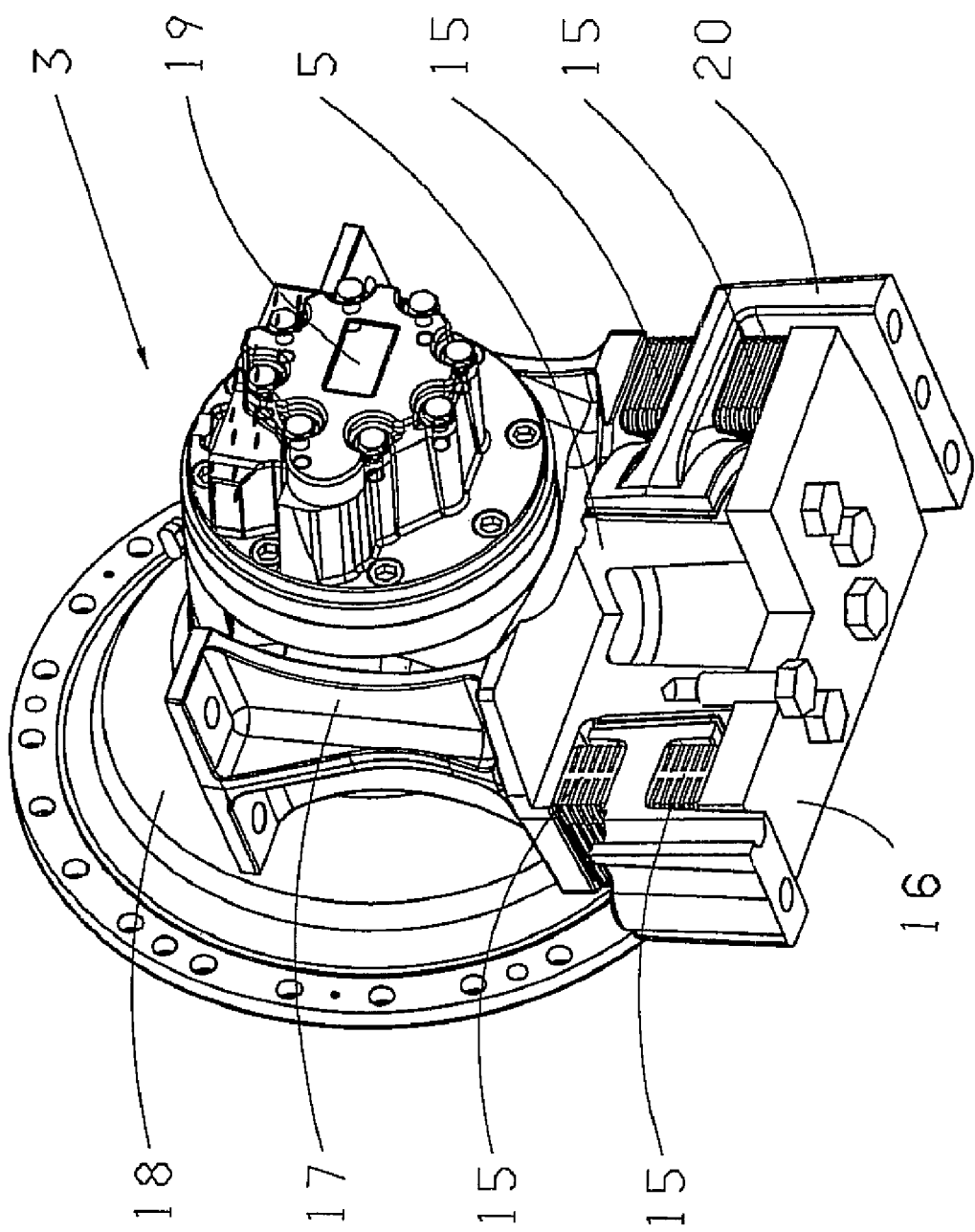
FIG. 3 is a perspective view of the mixing drum drive with the compensation device.

FIG. 3 shows a housing 17 of the drum drive 3 is integrally connected with the first component 5. The drum drive 3 has one output flange 18 which is connectable with the mixing drum. The drum drive 3 is preferably designed to have a planetary gear set whose ring gear is connected in a rotationally fixed manner with the housing 17 and whose sun gear is connected with a hydraulic motor 19. The elastic elements 15 are cuboidally designed and their longitudinal axis is arranged in a direction of the longitudinal axis of the mixing drum. The connecting element 20 can be connected with the bearing bracket 4 of FIG. 1.

Figure 4:
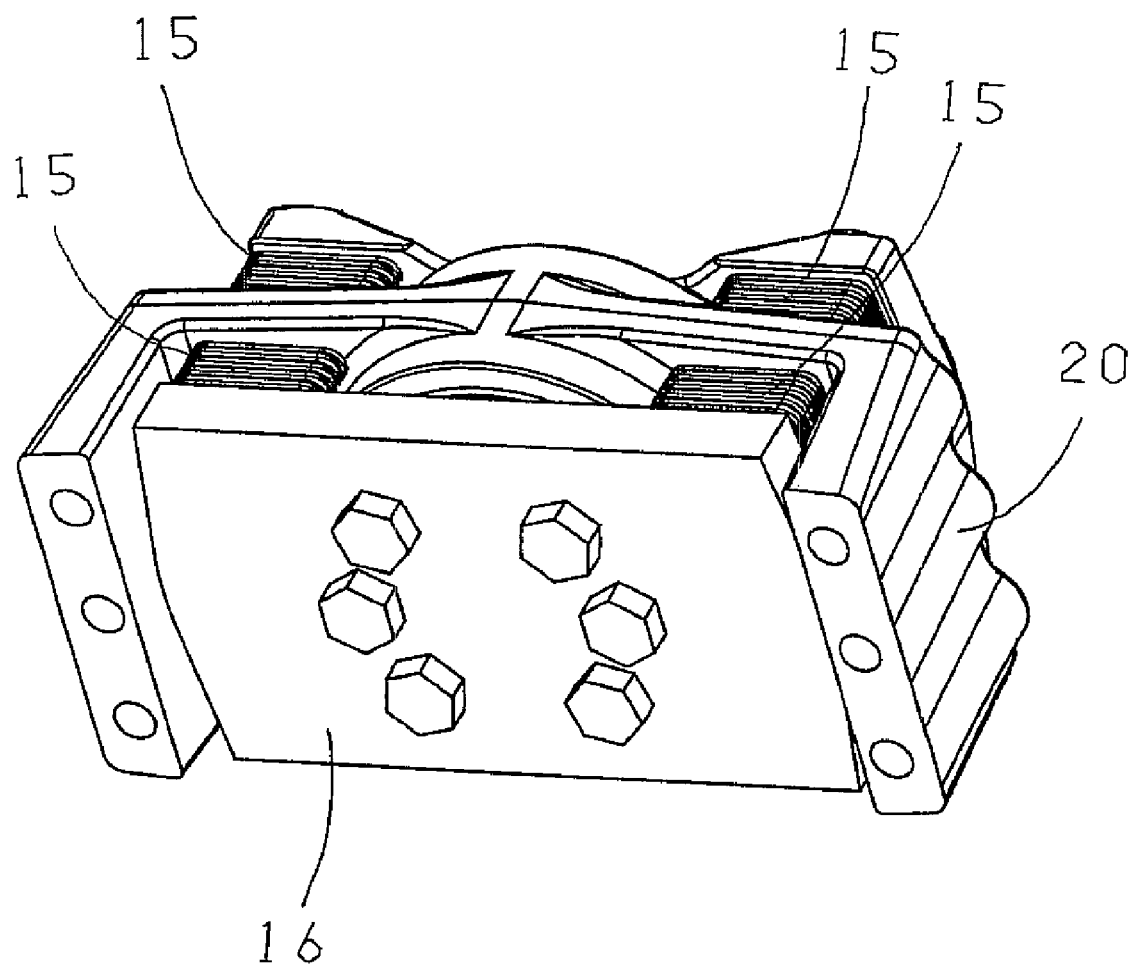
FIG. 4 is a perspective view of the compensation device.

FIG. 4: The first component 5 is introduced in the assembly after the introduction of the elastic elements 11 and 15 in the hollow body 8 and subsequently the plate 16 is screwed on the mandrel 6. Thereby the elastic elements 15 are held stationary and prestressed.

Figure 5:
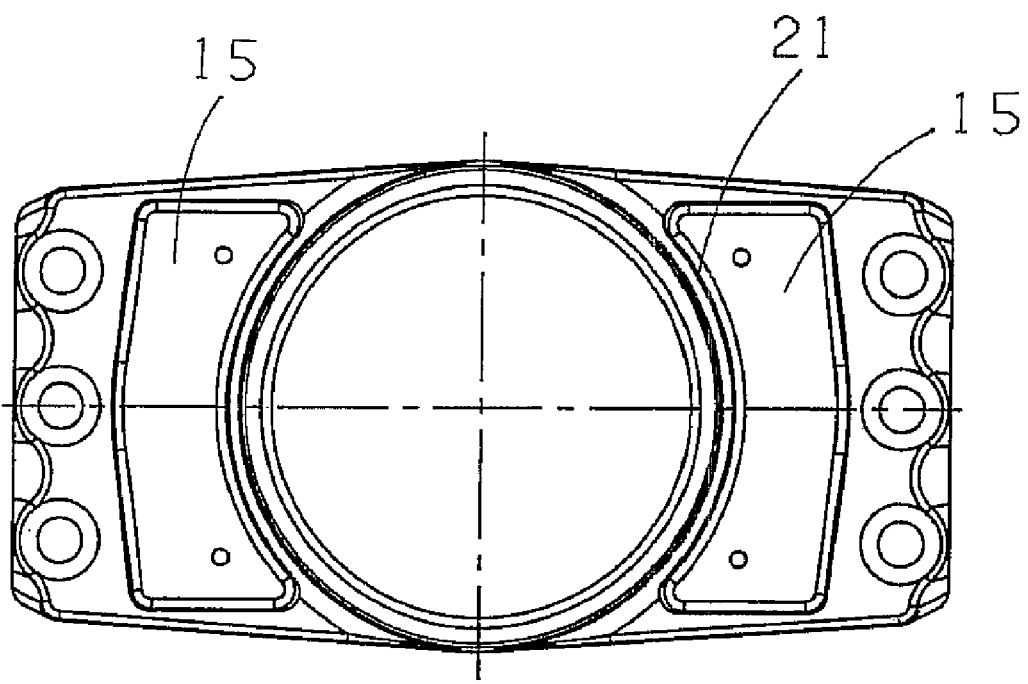
FIG. 5 is a horizontal section through the compensation device.

FIG. 5: The mandrel 6 is preferably designed to be circular and the elastic elements 15 as being a circular recess on an inner surface 21.

Figure 6:
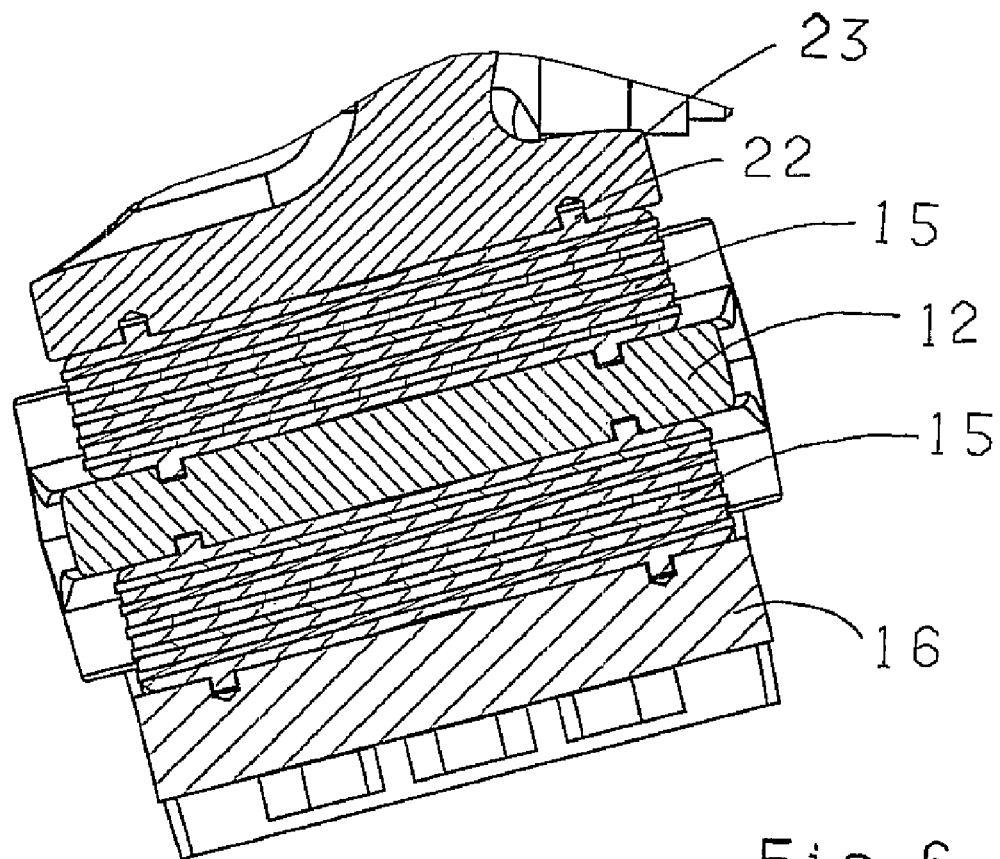
FIG. 6 is a vertical section through the compensation device.

FIG. 6: The elastic elements 15 have projections 22 which engage recesses 23. It is thereby possible that the elastic elements 15 are, in addition, stationarily fixed.

REFERENCE NUMERALS 1 mixing drum
2 rear mixing drum bearing
3 drum drive
4 bearing bracket
5 first component
6 mandrel
7 outer surface
8 hollow body
9 outer surface
10 inner surface
11 elastic element
12 second component
13 surfaces
14 surfaces
15 elastic elements
16 plate
17 housing
18 output flange
19 motor
20 connecting element
21 inner surface
22 projections
23 recesses

The invention claimed is:

1. A compensation device which compensates for an angular discrepancy of a mixing drum (1) relative to a bearing bracket (4), the compensation device comprising at least a first component (5) and a second component (12) of which one of the first component (5) and the second component (12) is one of connectable and integral with the bearing bracket (4), at least one elastic element (11, 15) is located between the first component (5) and the second component (12), a weight of the mixing drum is transmitted, via the compensation device, to the bearing bracket (4), the first component (5) has a mandrel (6) with an outer surface (7), at an end of which is attached further surfaces (13) radially extending from the outer surface (7) thus forming a cavity, and the second component (12) has a hollow body (8) with an inner surface (10) and an outer surface (9), the inner surface (10), at least partially, surrounds the mandrel (6), other surfaces (14) extend radially from the outer surface (9) and form a base, the base extends between the further surfaces (13) of the first component (5) into the cavity, the at least one elastic element (11, 15) is located between the further surfaces (13) of the first component (5) and the other surfaces (14) of the second component (12), the further surfaces (13) of the first component (5) and the other surfaces (14) of the second component (12) are designed such that the at least one elastic element (11, 15) is prestressed.

2. The compensation device according to claim 1, wherein a first elastic element (11) is located between the outer surface (7) of the mandrel (6) and the inner surface (10) of the hollow body (8).

3. The compensation device according to claim 1, wherein the further surfaces (13) of the first component (5) and the other surfaces (14) of the second component (12) extend radially from an axis of rotation of the mixing drum (1) and transmit torque generated to induce rotation of the mixing drum (1).

4. The compensation device according to claim 1, wherein a first of the first component (5) and the second component (12) is one of connectable and integral with a housing (17) of a drum drive (3) and a second of the first component (5) and the second component (12) is one of connectable and integral with the bearing bracket (4).

5. The compensation device according to claim 1, wherein the at least one elastic element (11, 15) comprises steel elements and elastomeric parts that are alternately layered to form spring sets.

6. The compensation device according to claim 1, wherein the outer surface (7) of the mandrel (6) and the inner surface (10) of the hollow body (8) are conical.

7. The compensation device according to claim 1, wherein the further surfaces (13) of the first component (5) are connected to the mandrel (6) via connecting elements.

8. The compensation device according to claim 1, wherein the surfaces (13) of the first component (5) are integral with the mandrel (6).

9. The compensation device according to claim 1, wherein ends of the other surfaces (14) of the second component (12) remote from the hollow body (8) are connectable with the bearing bracket (4).

10. A mixing gear arrangement with a compensation device according to claim 1, wherein a housing (17) of a drum drive (3) is integral with the first component (4) and at least one planetary stage and one anti-friction bearing are arranged within the housing (17) to transmit drive from the housing (17) to the mixing drum (1), and a ring gear of the at least one planetary stage forms an output.

11. A device which compensates for an angular discrepancy between a mixing drum (1) of a mixing truck and a bearing bracket (4), which radially supports the mixing drum (1), the device comprising:

- a first component (5) having a mandrel (6) and two radial surfaces (13), the mandrel (6) has an outer surface (7) from which the two radial surfaces (13) of the first component (5) radially extend forming a radially outwardly open cavity;
- a second component (12) having a hollow body (8) and two radial surfaces (14), the hollow body (8) has an inner surface (10) and an outer surface (9) and is located within the radially outwardly open cavity, the two radial surfaces (14) of the second component (12) extend radially outwardly from the outer surface (9) of the hollow body (8) to outside the radially outwardly open cavity, and the inner surface (10) of the hollow body (8) is aligned with the outer surface (7) of the mandrel (6);
- at least a first elastic element (11) is located between the outer surface (7) of the mandrel (6) and the inner surface (10) of the hollow body (8) to at least partially provide elastic support between the first component (5) and the second component (12); and
- at least a second elastic element (15) is located between the two radial surfaces (13) of the first component (5) and the two radial surfaces (14) of the second component (12) to at least partially provide elastic support between the first component (5) and the second component (12).

* * * * *